(12) United States Patent
Park et al.

(10) Patent No.: US 12,100,887 B2
(45) Date of Patent: Sep. 24, 2024

(54) IMAGE DISPLAY DEVICE INTEGRATED WITH ANTENNA AND ANTENNA FOR IMAGE DISPLAY DEVICE

(71) Applicants: DONGWOO FINE-CHEM CO., LTD., Jeollabuk-do (KR); KREEMO INC., Seoul (KR)

(72) Inventors: Dong Pil Park, Incheon (KR); Yun Seok Oh, Gyeonggi-do (KR); Yoon Ho Huh, Seoul (KR); Won Bin Hong, Seoul (KR)

(73) Assignees: DONGWOO FINE-CHEM CO., LTD., Jeollabuk-Do (KR); KREEMO INC., Seoul (KR)

( * ) Notice: Subject to any disclaimer, the term of this patent is extended or adjusted under 35 U.S.C. 154(b) by 1005 days.

(21) Appl. No.: 17/012,505

(22) Filed: Sep. 4, 2020

(65) Prior Publication Data
US 2020/0403297 A1  Dec. 24, 2020

Related U.S. Application Data

(63) Continuation of application No. PCT/KR2019/002565, filed on Mar. 6, 2019.

(30) Foreign Application Priority Data

Mar. 6, 2018  (KR) ........................ 10-2018-0026380

(51) Int. Cl.
*H01Q 1/24* (2006.01)
*H01Q 1/46* (2006.01)
*H04M 1/02* (2006.01)

(52) U.S. Cl.
CPC ............... *H01Q 1/243* (2013.01); *H01Q 1/46* (2013.01); *H04M 1/0249* (2013.01); *H04M 1/0266* (2013.01); *H04M 1/0277* (2013.01)

(58) Field of Classification Search
CPC ........... H01Q 1/24; H01Q 1/243; H01Q 1/38; H01Q 1/46; H01Q 21/00; H01Q 21/0006;
(Continued)

(56) References Cited

U.S. PATENT DOCUMENTS 11,316,238 B2 * 4/2022 Huh ..................... H01Q 9/0407
11,658,395 B2 * 5/2023 Kim ..................... H01Q 1/2291
343/702

(Continued)

FOREIGN PATENT DOCUMENTS

CN  101098044 A  1/2008
CN  101155473 A  4/2008
(Continued)

OTHER PUBLICATIONS

International Search Report for PCT/KR2019/002565 mailed on Jun. 12, 2019.
(Continued)

*Primary Examiner* — Tho G Phan
(74) *Attorney, Agent, or Firm* — The PL Law Group, PLLC

(57) ABSTRACT

An image display device according to an embodiment of the present invention includes a printed circuit board, an antenna mounted on the printed circuit board, a display panel disposed on the printed circuit board, and a transmission line disposed on the display panel and electrically connected to the antenna. The transmission line is disposed on the display panel to shorten a signal path and reduce noises.

17 Claims, 5 Drawing Sheets

(58) Field of Classification Search
CPC ...... H04M 1/02; H04M 1/0249; H04M 1/026; H04M 1/0266; H04M 1/0277; G11B 25/04; G11B 33/14; H01L 27/32; H01L 51/52

See application file for complete search history.

(56) References Cited

U.S. PATENT DOCUMENTS

| | | | |
|---|---|---|---|
| 11,764,458 B2 * | 9/2023 | Choi | H01Q 5/22 |
| | | | 343/720 |
| 11,848,484 B2 * | 12/2023 | Lee | H01Q 1/243 |
| 11,870,150 B2 * | 1/2024 | Kim | H01Q 21/28 |
| 2008/0074334 A1 | 3/2008 | Kang | |
| 2014/0106684 A1 | 4/2014 | Burns et al. | |
| 2015/0185960 A1 | 7/2015 | Kim | |
| 2016/0190678 A1 | 6/2016 | Hong et al. | |
| 2017/0237152 A1 | 8/2017 | Lee et al. | |
| 2017/0302771 A1 | 10/2017 | Kim et al. | |
| 2017/0309995 A1 | 10/2017 | Kim et al. | |

FOREIGN PATENT DOCUMENTS

| | | | |
|---|---|---|---|
| CN | 105742797 A | | 7/2016 |
| CN | 105938405 A | | 9/2016 |
| CN | 107017462 A | | 8/2017 |
| CN | 107646095 A | | 1/2018 |
| JP | 4300873 B2 | | 7/2009 |
| JP | 2017-175540 A | | 9/2017 |
| KR | 10-2011-0071368 A | | 6/2011 |
| KR | 10-2013-0070247 A | | 6/2013 |
| KR | 10-2016-0059291 A | | 5/2016 |
| KR | 10-2017-0073772 A | | 6/2017 |

OTHER PUBLICATIONS

Zhang Shi-hong et al., "Shielding Method for Electromagnetic Interference Problem of Liquid Crystal Display Module", Advanced Display, No. 11, pp. 18-21, 2009 (English Abstract is included in the first page.).

Sun Shou-hong et al. EMC prediction of liquid crystal display module under transient irradiation in electromagnetic field, Optics and Precision Engineering vol. 22, No. 12, 2014, (English Abstract is included in the first and second page.).

Lee Sae-Won et al., "Polymer MEMS Fabrication Process for System-on-Chip Self-Assembled Millimeter-Wave Antennas", DTIP 2014.

* cited by examiner 160  170  172

50

60

IMAGE DISPLAY DEVICE INTEGRATED WITH ANTENNA AND ANTENNA FOR IMAGE DISPLAY DEVICE

CROSS REFERENCE TO RELATED APPLICATIONS AND CLAIM OF PRIORITY

The present application is a continuation application to International Application No. PCT/KR2019/002565 with an International Filing Date of Mar. 6, 2019, which claims the benefit of Korean Patent Application No. 10-2018-0026380 filed on Mar. 6, 2018 at the Korean Intellectual Property Office, the disclosures of which are incorporated by reference herein in their entirety.

BACKGROUND

1. Field

The present invention relates to an image display device integrated with an antenna and an antenna for an image display device.

2. Description of the Related Art

As information technologies have been developed, a wireless communication technology such as Wi-Fi, Bluetooth, etc., is combined with a display device in, e.g., a smartphone form. In this case, an antenna may be combined with the display device to provide a communication function.

As mobile communication technologies have been rapidly developed, an antenna capable of operating a high or ultra-high frequency communication is needed in the display device. Further, as communication functions are included in one display device, a plurality of antennas capable of sensing different frequencies are combined with the display device.

The plurality of antennas may be connected to each other by antenna wires such as transmission lines. However, as various driving circuit chips, memory devices, sensor chips, etc., are integrated in the display device, a space or an area in which the antenna wires can be arranged is reduced. Accordingly, the antenna wiring may be bypassed or a length of the antenna wiring may be increased, thereby increasing a signal resistance.

Additionally, various circuit structures such as resistors, capacitor and condensers are included in the display device, and an antenna signal may be interfered or disturbed by noises generated from the circuit structures.

SUMMARY

According to an aspect of the present invention, there is provided an image display device integrated with an antenna which has improved signaling efficiency and reliability.

According to an aspect of the present invention, there is provided an antenna for an image display device which has improved signaling efficiency and reliability.

(1) An image display device, including: a printed circuit board; an antenna mounted on the printed circuit board; a display panel disposed on the printed circuit board; and a transmission line disposed on the display panel and electrically connected to the antenna.

(2) The image display device according to the above (1), further including an electronic device mounted on the printed circuit board.

(3) The image display device according to the above (2), wherein the electronic device includes a display driving integrated circuit (IC) chip and a memory device.

(4) The image display device according to the above (2), wherein the electronic device and the antenna are mounted on the same surface of the printed circuit board.

(5) The image display device according to the above (1), further including a connection structure electrically connecting the transmission line and the antenna with each other.

(6) The image display device according to the above (5), wherein the connection structure includes a flexible printed circuit board (FPCB).

(7) The image display device according to the above (5), wherein the connection structure is connected to an end portion of the transmission line, and extends toward the printed circuit board through a peripheral area of the image display device to be connected to the antenna.

(8) The image display device according to the above (5), wherein a plurality of the antennas are electrically connected to each other via the connection structure and the transmission line.

(9) The image display device according to the above (1), wherein the transmission line includes a mesh structure.

(10) The image display device according to the above (9), further including a dummy pattern disposed around the transmission line, the dummy pattern including a mesh structure the same as that of the transmission line.

(11) The image display device according to the above (1), further including a dielectric layer disposed on the display panel, wherein the transmission line is arranged on a top surface of the dielectric layer.

(12) The image display device according to the above (11), wherein the transmission line includes: a pair of ground lines; and a signal line interposed between the ground lines.

(13) The image display device according to the above (11), further including a ground layer disposed on a bottom surface of the dielectric layer.

(14) The image display device according to the above (13), wherein the display panel includes a thin film transistor array substrate, a display layer and an electrode, and the electrode of the display panel serves as the ground layer.

(15) The image display device according to the above (1), further including: an upper encapsulation layer disposed on the transmission line; and a window substrate disposed on the upper encapsulation layer.

(16) The image display device according to the above (1), wherein the antenna and the transmission line are disposed at different levels from each other with respect to the display panel.

(17) An antenna for an image display device including a display panel, including: a dielectric layer; a transmission line disposed on the dielectric layer; a radiation pattern disposed under the dielectric layer and spaced apart from the dielectric layer with a display panel interposed therebetween; and a connection structure electrically connecting the radiation pattern and the transmission line with each other.

According to an embodiment of the present invention, a transmission line and an antenna may be disposed to be spaced apart from each other at different layers or different levels with a display panel interposed therebetween. Thus, the transmission line may be arranged without a spatial limitation by a display driving integrated circuit (IC) chip, a memory device, etc., on a printed circuit board (PCB) of an image display device. Therefore, signal loss through the transmission line may be reduced, and interference and disturbance caused by noises from circuit devices on the printed circuit board may be removed or reduced.

In some embodiments, the antenna and the transmission line may be electrically connected to each other by a connection structure through a bezel area of the image display device, and the signal path through the transmission line and the connection structure may become shortened.

In some embodiments, the transmission line may include a mesh structure, and may have improved transmittance and transparency, and thus image quality implemented by the display panel may be enhanced.

DETAILED DESCRIPTION OF THE EMBODIMENTS

According to an exemplary embodiment of the present invention, there is a provided image display device including a transmission line and an antenna spaced apart from each other with a display panel interposed therebetween. For example, there is provided a display device including an antenna for 3G-5G mobile communications embedded therein.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
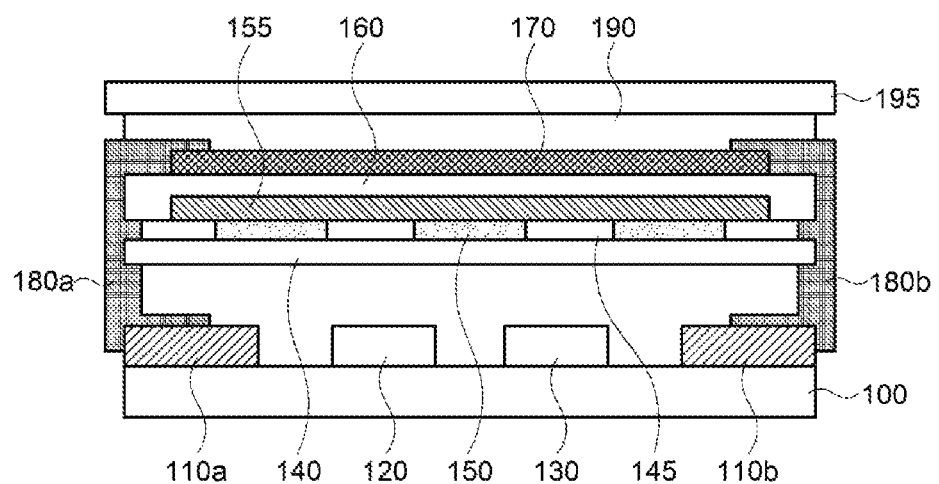
FIGS. 1 and 2 are schematic cross-sectional views illustrating an image display device in accordance with an exemplary embodiment.
Figure 2:
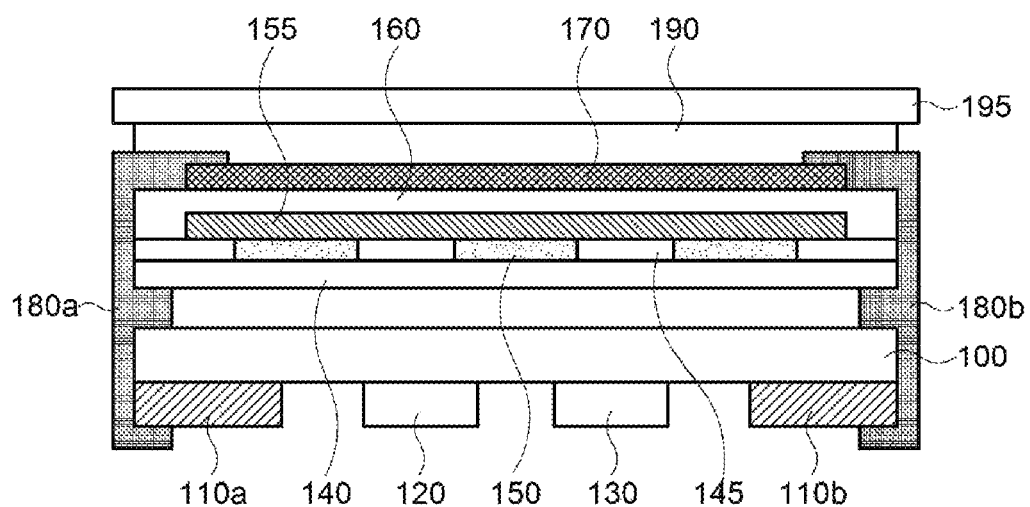

FIGS. 1 and 2 are schematic cross-sectional views illustrating an image display device in accordance with an exemplary embodiment.

Referring to FIGS. 1 and 2, the image display device may include a printed circuit board 100 and a display panel 140, and may include antennas 110a and 110b mounted on the printed circuit board (PCB) 100 and a transmission line 170 disposed on the display panel 140.

The printed circuit board 100 may have a structure in which metal layers forming internal circuits and insulation layers may be repeatedly stacked. Connection pads such as a solder connecting the internal circuit and electronic devices may be formed on the printed circuit board 100. For example, the printed circuit board 100 may serve as a main board of the image display device The electronic device and the antennas 110a and 110b may be mounted on the printed circuit board 100 through, e.g., the connection pads. As illustrated in FIG. 1, the electronic device and the antennas 110a and 110b may be arranged on a top surface of the printed circuit board 100. As illustrated in FIG. 2, the electronic device and the antennas 110a and 110b may be also arranged on a bottom surface of the printed circuit board 100.

In an embodiment, the electronic device and the antennas 110a and 110b may be distributed on the top and bottom surfaces of the printed circuit board 100.

A plurality of antennas may be mounted on the printed circuit board 100. The plurality of antennas may have different resonance frequencies.

For example, the first antenna 110a and the second antenna 110b may be mounted separately on the printed circuit board 100, and three or more antennas may be mounted.

Each of the antennas 110a and 110b may include a radiation pattern, and may also include a pad electrode for a connection with the transmission line 170 and/or the internal circuit of the printed circuit board 100. The radiation pattern and the pad electrode may include a metal or an alloy.

The antennas 110a and 110b may be mounted on the printed circuit board 100 in the form of an antenna patch or an antenna chip.

The electronic device may include, e.g., a display driving integrated circuit (IC) chip 120, a memory device 130, etc. The memory device 130 may include, e.g., an RAM device or a flash memory device.

The electronic device may also include an IC chip for driving various sensor devices included in the image display device. For example, the electronic device may include a driving IC chip of a touch sensor or a touch screen panel.

The electronic device may include various circuit structures of the image display device, such as a resistor, a capacitor, a condenser, etc.

The display panel 140 may be disposed on the printed circuit board 100. In an exemplary embodiment, the printed circuit board 100 and the display panel 140 may be separated by a predetermined distance.

For example, the printed circuit board 100 and the display panel 140 may be fixed by a housing of the image display device so that an isolation space may be formed between the printed circuit board 100 and the display panel 140.

In an embodiment, an insulation structure such as an adhesive layer, a spacer, etc., may be disposed in the isolation space.

A portion of the image display device below the display panel 140 may correspond to a rear portion of the image display device, and the printed circuit board 100 on which the above-described antennas 110a and 110b and the electronic device may be disposed below the display panel 140. A portion over the display panel 140 may correspond to a front portion where an image of the image display device is implemented.

The display panel 140 may include, e.g., a thin film transistor (TFT) array substrate. For example, the TFT array substrate may include a base substrate such as a glass substrate or a resin substrate, a thin film transistor arranged on the base substrate, a scan line, and a data line, etc. In FIGS. 1 and 2, a reference numeral "140" may be used interchangeably to commonly refer to the display panel and the TFT array substrate.

The display panel 140 may include a pixel defining layer 145 and a display layer 150 arranged on the TFT array substrate. For example, a pixel electrode included in the thin film transistor may be partially exposed by the pixel defining layer 145 to define each pixel, and the display layer 150 may be formed on the exposed surface of the pixel electrode.

The pixel defining layer 145 may include an inorganic insulation material or an organic insulation material. The display layer 150 may include, e.g., an organic light-emitting layer or a liquid crystal layer. When the display layer 150 includes an organic light-emitting layer, the image display device may be provided as an organic light emitting diode (OLED) display device. In this case, the display layer 150 may further include a hole transport layer, an electron transport layer, etc.

When the display layer 150 includes a liquid crystal layer, the image display device may be provided as a liquid crystal display (LCD) device. In this case, a backlight, a polarizing plate, etc., may be further disposed between the display panel 140 and the printed circuit board 100.

A reflective electrode 155 may be disposed on the display layer 150. For example, the reflective electrode 155 may serve as a common electrode extending on a plurality of the display layers 150 or pixels.

A dielectric layer 160 may be formed on the reflective electrode 155 and the pixel defining layer 145. The dielectric layer 160 may function as a lower encapsulation layer protecting the display panel 140.

The transmission line 170 may be disposed on the dielectric layer 160. The transmission line 170 may be electrically connected to the antennas 110a and 110b, and may serve as a feeding and signal transmission/reception path between an antenna driving IC chip and the antennas 110a and 110b.

In an exemplary embodiment, the transmission line 170 may include a mesh structure. For example, a metal or an alloy used in the radiation pattern may be patterned in the form of a plurality of intersecting electrode lines to form the transmission line 170. Accordingly, transmittance to an upper side of the display panel 140 may be improved, and image quality may be also improved.

In an exemplary embodiment, the transmission lines 170 and the antennas 110a and 110b located on upper and lower sides of the display panel 140, respectively, may be electrically connected to each other by connection structures 180a and 180b.

In some embodiments, the transmission line 170 and the first antenna 110a may be connected to each other by a first connection structure 180a, and the transmission line 170 and the second antenna 110b may be connected to each other by a second connection structure 180b. Accordingly, the first and second antennas 110a and 110b disposed under the display panel 140 may be electrically connected or grouped with each other via the transmission line 170.

The connection structures 180a, 180b may include a metal wire or a flexible circuit board (FPCB).

As illustrated in FIG. 1, when the antennas 110a and 110b are mounted on a top surface of the printed circuit board 100, one end of the connection structure 180a and 180b may extend over the display panel 140 to be connected to one end of the transmission line 170. An opposite end of the connection structure 180a and 180b may be bent between the display panel 140 and the printed circuit board 100 to be connected to the antennas 110a and 110b. For example, the opposite end of the connection structure 180a and 180b may be electrically connected to the pad electrode included in the antennas 110a and 110b.

As illustrated in FIG. 2, when the antennas 110a and 110b are mounted on a bottom surface of the printed circuit board 100, the connecting structure 180a and 180b may extend from one end of the transmission line 170 to the bottom surface of the printed circuit board 100 to be connected to the antennas 110a and 110b.

An upper encapsulation layer 190 may be formed on the transmission line 170. The upper encapsulation layer 190 may include an inorganic insulation material such as silicon oxide or silicon nitride, an organic insulating material such as acrylic resin or imide resin, or an organic-inorganic hybrid film.

A window substrate 195 may be disposed on the upper encapsulation layer 190. The window substrate 195 may provide a viewing surface to a user of the image display device.

In some embodiments, the image display device may further include a sensor structure such as a touch sensor or a touch screen panel or an optical structure such as a polarizing plate or a retardation film.

The sensor structure or the optical structure may be disposed between the window substrate 195 and the transmission line 170. Alternatively, the sensor structure or the optical structure may be disposed between the transmission line 170 and the display panel 140.

In an embodiment, the sensor structure or the optical structure may be interposed between the window substrate 195 and the transmission line 170 so that a signaling path via the transmission line 170 may be shortened and a signaling sensitivity may be enhanced.

As described above, according to an exemplary embodiment, the antennas 110a and 110b and the transmission line 170 may be arranged to be spaced apart from each other at different levels with the display panel 140 interposed therebetween. Accordingly, the transmission line 170 may be arranged without a spatial limitation by electronic devices such as the display driving integrated circuit (IC) chip 120 and the memory device 130. Thus, the signaling path may be shortened to prevent resistance increase and signal loss through the transmission line 170.

Figure 3:
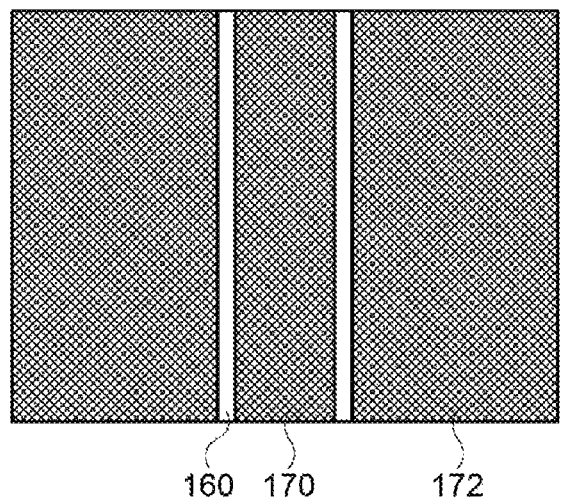
FIG. 3 is a schematic top planar view illustrating a dummy pattern around a transmission line in accordance with an exemplary embodiment.

FIG. 3 is a schematic top planar view illustrating a dummy pattern around a transmission line in accordance with some exemplary embodiments.

Referring to FIG. 3, as described with reference to FIGS. 1 and 2, the transmission line 170 may be disposed on the dielectric layer 160, and the transmission line 170 may include a mesh structure.

In an exemplary embodiment, a dummy pattern 172 may be included around the transmission line 170 on the dielectric layer 160. The dummy pattern 172 may be separated from the transmission line 170 by a predetermined distance and may be electrically and physically separated from the transmission line 170.

The dummy pattern 172 may include a mesh structure substantially the same as or similar to that of the transmission line 170.

For example, the dummy pattern 172 may be formed of the same material as that of the transmission line 170, and may include the mesh structure having a line width of electrode lines and an aperture ratio the same as those in the transmission line 170. Thus, an optical deviation caused by the transmission line 170 may be reduced so that the transmission line 170 may be prevented from being viewed by the user of the image display device.

Figure 4:
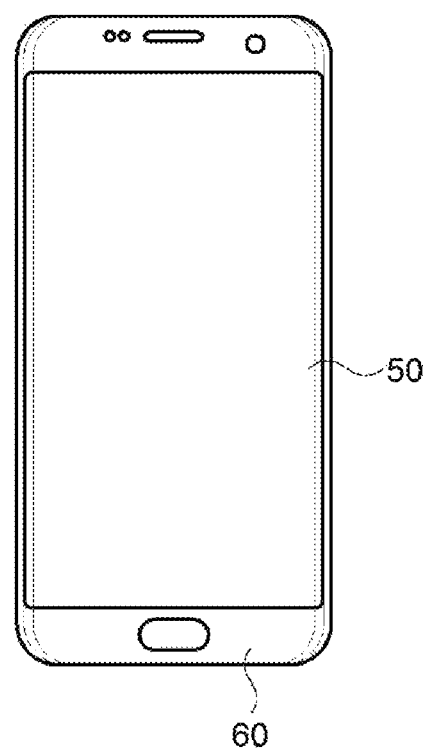
FIGS. 4 and 5 are schematic top planar views illustrating an image display device in accordance with an exemplary embodiment.
Figure 5:
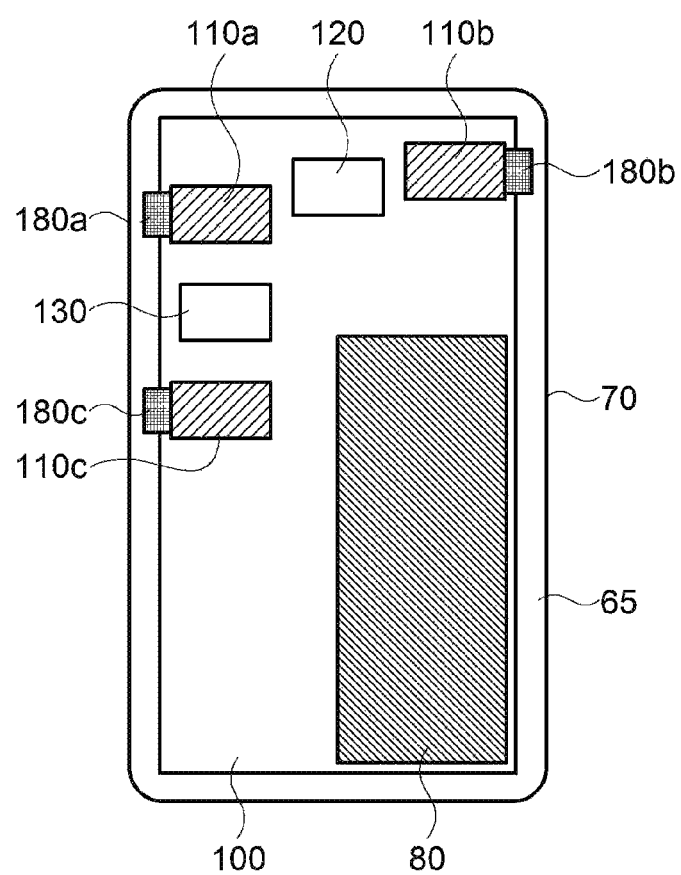

FIGS. 4 and 5 are schematic top planar views illustrating an image display device in accordance with an exemplary embodiment. For example, FIG. 4 is a top planar view illustrating a front portion of the image display device, and FIG. 5 is a top planar view illustrating a rear portion of the image display device excluding a rear cover.

Referring to FIGS. 4 and 5, the image display device may include a display area 50 and a peripheral area 60 on a front portion thereof. An image generated from the display panel 140 as illustrated in FIG. 1 or 2 may be displayed to a user through the display area 50. The transmission line 170 may be disposed on the display panel 140, and may include a substantially transparent mesh structure so that degradation of image quality may be prevented.

The peripheral area 60 may be located at both end portions and both lateral portions of the display area 50. The peripheral area 60 may include a bezel area 65 between a housing 70 of the image display device and the printed circuit board 100.

The antennas 110a, 110b, and 110c may be mounted on the printed circuit board 100, and the electronic devices 120 and 130 may be also mounted on the printed circuit board 100. Additionally, a battery 80 may be combined on the printed circuit board 100.

As described with reference to FIGS. 1 and 2, the connection structures 180a, 180b and 180c such as a flexible circuit board (FPCB) may each be connected to the transmission line 170 on the display panel 140, and may extend toward the printed circuit board 100 to be connected to the antennas 110a, 110b and 110c through the bezel area 65. Accordingly, the antennas 110a, 110b and 110c may be electrically connected to each other through the transmission line 170, and may be controlled and fed together through, e.g., an antenna driving IC chip.

Further, the connection structures 180a, 180b and 180c may be connected to the antennas 110a, 110b and 110c through the bezel area 65 so that image implementation in the display area 50 may not be interrupted by the connection structures 180a, 180b and 180c.

Figure 6:
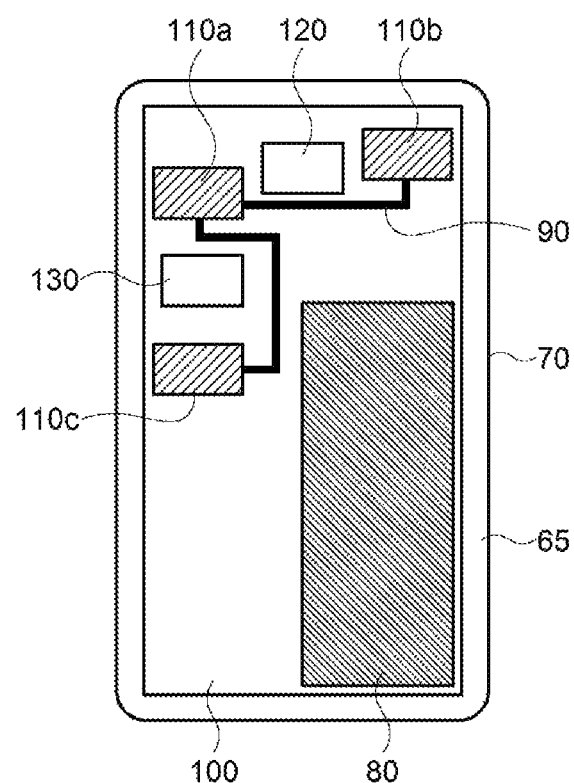
FIG. 6 is a schematic top planar view illustrating an image display device in accordance with a comparative example.

FIG. 6 is a schematic top planar view illustrating an image display device in accordance with a comparative example.

Referring to FIG. 6, in a comparative example, first to third antennas 110a, 110b and 110c are mounted on the printed circuit board 100 together with the electronic devices (e.g., display driving integrated circuit (IC) chip 120 and memory device 130), and the transmission lines 90 are also mounted on the printed circuit board 100 together with the antennas 110a, 110b and 110c.

The transmission line 90 for connecting the first antenna 110a and the second antenna 110b to each other is arranged to bypass the display driving integrated circuit (IC) chip 120, and the transmission line 90 for connecting the second antenna 110b and the third antenna 110c to each other is arranged to bypass the memory device 130.

Thus, a length of the transmission line 90 is increased, and a signal loss level may become greater due to an increase in resistance. Further, an antenna signal may be interfered or disturbed by RLC noises caused by resistors, condensers, capacitors, etc. embedded in or connected to the printed circuit board 100.

However, according to an exemplary embodiment described with reference to FIGS. 1 to 5, the transmission line 170 may be spaced apart from the antennas 110a, 110b and 110c with the display panel 140 interposed therebetween, and the antennas 110a, 110b and 110c and the transmission line 170 may be connected to each other by the connection structures 180a, 180b and 180c through the bezel area 65.

Accordingly, an antenna driving having a short signal path and substantially free from noises caused by various electronic devices and circuit devices mounted on the printed circuit board 100 may be implemented.

Figure 7:
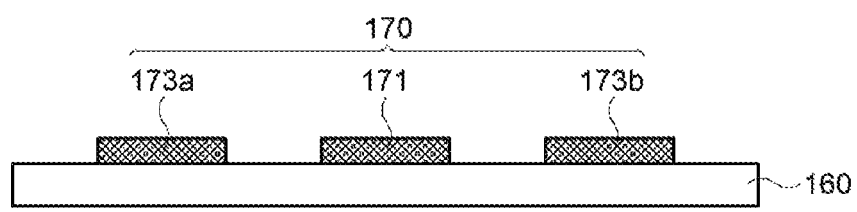
FIGS. 7 and 8 are schematic cross-sectional views illustrating a construction of a transmission line in accordance with an exemplary embodiment.
Figure 8:
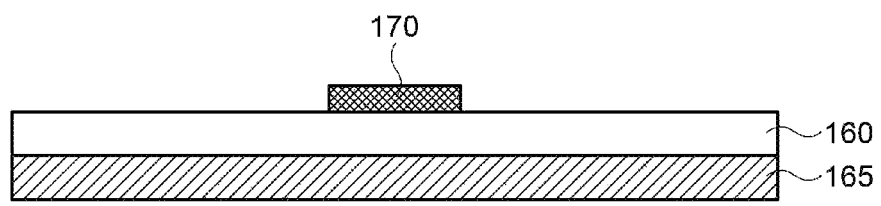

FIGS. 7 and 8 are schematic cross-sectional views illustrating a construction of a transmission line in accordance with an exemplary embodiment.

Referring to FIG. 7, as described above, the transmission line 170 may be arranged on the dielectric layer 160 formed on the display panel 140.

The dielectric layer 160 may include an insulation material having a predetermined dielectric constant. The dielectric layer 160 may include, e.g., an inorganic insulation material such as glass, silicon oxide, silicon nitride or a metal oxide, or an organic insulation material such as an epoxy resin, an acrylic resin, an imide-based resin, a styrene-based resin, a polyester-based resin, a urethane-based resin, or the like.

In some embodiments, the dielectric constant of the dielectric layer 160 may be adjusted in a range from about 1.5 to about 12. If the dielectric constant exceeds about 12, a driving frequency may be excessively reduced, and the antenna driving in a desired high frequency band may not be realized.

The transmission line 170 may include a signal line 171 and a ground line 173a and 173b. In some embodiments, the signal line 171 may be disposed between a pair of ground lines 173a and 173b.

In this case, the signal line 171 may be electrically connected to the antennas 110a, 110b and 110c through the connection structures 180a, 180b and 180c. The ground lines 173a and 173b may be connected to ground wirings or ground patterns included in the connection structures 180a, 180b and 180c.

Referring to FIG. 8, the transmission line 170 may be disposed on a top surface of the dielectric layer 160, and a ground layer 165 may be formed on a bottom surface of the transmission line 170.

In some embodiments, a conductive member included in the display panel 140 may serve as the ground layer 165. The conductive member may include, e.g., a gate electrode of a thin film transistor (TFT) included in the display panel 140, various wirings such as a scan line or a data line or various electrodes such as a pixel electrode, a common electrode, etc.

In an embodiment, the reflective electrode 155 included in the display panel 140 may serve as the ground layer 165.

What is claimed is:

1. An image display device, comprising:
a printed circuit board;
an antenna mounted on the printed circuit board;
a display panel disposed on the printed circuit board
a transmission line disposed on the display panel and electrically connected to the antenna; and
a connection structure electrically connecting the transmission line and the antenna with each other.

2. The image display device according to claim 1, further comprising an electronic device mounted on the printed circuit board.

3. The image display device according to claim 2, wherein the electronic device comprises a display driving integrated circuit (IC) chip and a memory device.

4. The image display device according to claim 2, wherein the electronic device and the antenna are mounted on the same surface of the printed circuit board.

5. The image display device according to claim 1, wherein the connection structure comprises a flexible printed circuit board (FPCB).

6. The image display device according to claim 1, wherein image display device comprises a display area and a peripheral area; and the connection structure is connected to an end portion of the transmission line, and extends toward the printed circuit board through the peripheral area to be connected to the antenna.

7. The image display device according to claim 1, wherein the antenna comprises a plurality of antennas electrically connected to each other via the connection structure and the transmission line.

8. The image display device according to claim 1, wherein the transmission line includes a mesh structure.

9. The image display device according to claim 8, further comprising a dummy pattern disposed around the transmission line, the dummy pattern including a mesh structure which is the same as that of the transmission line.

10. The image display device according to claim 1, further comprising a dielectric layer disposed between the display panel and the transmission line.

11. The image display device according to claim 10, wherein the transmission line comprises:
   a pair of ground lines; and
   a signal line interposed between the pair of ground lines.

12. The image display device according to claim 10, further comprising a ground layer disposed on a bottom surface of the dielectric layer.

13. The image display device according to claim 12, wherein the display panel comprises a thin film transistor array substrate, a display layer and an electrode serving as the ground layer.

14. The image display device according to claim 1, further comprising:
   an upper encapsulation layer disposed on the transmission line; and
   a window substrate disposed on the upper encapsulation layer.

15. The image display device according to claim 1, wherein the antenna and the transmission line are disposed at different levels from each other with respect to the display panel.

16. An image display device, comprising:
   a printed circuit board;
   an antenna mounted on the printed circuit board;
   a display panel disposed on the printed circuit board;
   a dielectric layer disposed on the display panel; and
   a transmission line disposed on a top surface of the dielectric layer and electrically connected to the antenna, the transmission line comprising a pair of ground lines and a signal line interposed between the ground lines.

17. The image display device according to claim 16, further comprising a ground layer disposed on a bottom surface of the dielectric layer.

* * * * *